2,744,497

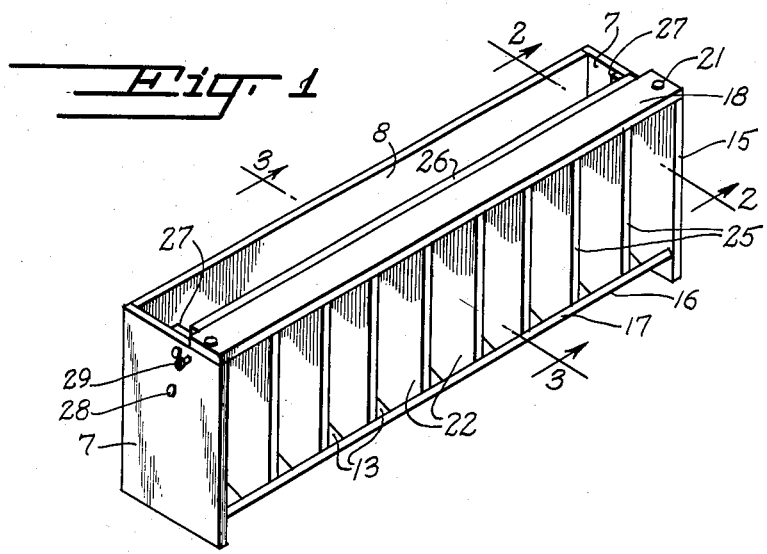
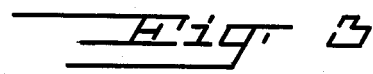
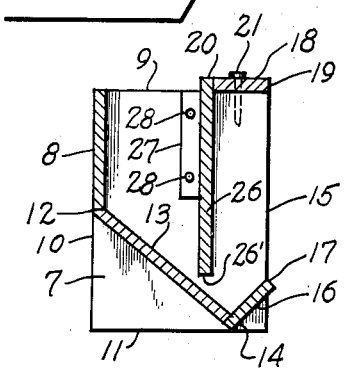
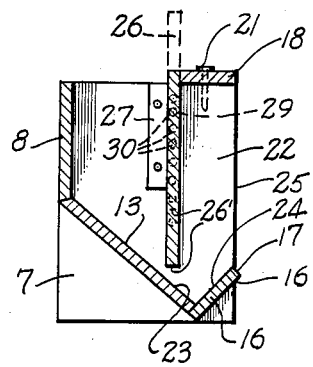
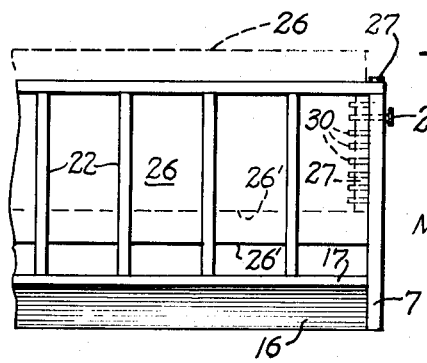
INVENTORS
Milton E. Fisher & Paul C. Fisher
BY
McMorrow, Berman + Davidson
ATTORNEYS

SELF-FEEDING PIG FEEDER

Milton E. Fisher and Paul C. Fisher, Cedar Falls, Iowa

Application August 7, 1953, Serial No. 373,026

3 Claims. (Cl. 119—53)

This invention relates to an improved self-feeding feeder especially, but not exclusively, for weaning pigs, and the primary object of the invention is to provide a more simply constructed, more efficient and serviceable device of this kind, which can be more easily maintained in a sanitary condition, which is readily adjustable to predetermine the rate of gravity feed of feed stuffs, and whose construction provides for minimum waste of feed stuffs.

Other important objects and advantageous features of the invention will be apparent from the following description and the accompanying drawing, wherein, for purposes of illustration only, a specific form of the invention is set forth in detail.

In the drawings:

Figure 1 is a front perspective view.

Figure 2 is a transverse vertical section taken on the line 2—2 of Figure 1.

Figure 3 is a transverse vertical section taken on the line 3—3 of Figure 1 and showing in dotted lines an upwardly adjusted position of the feed board or gate.

Figure 4 is an enlarged fragmentary front elevation showing further structural details.

Referring in detail to the drawings, wherein like numerals designate like parts throughout the several views, the illustrated feeder comprises similar end walls 7, 7 preferably of vertically elongated rectangular form, a perpendicular and abbreviated back wall 8, which reaches downwardly from the upper edges 9 of the end walls and along the rear edges 10 of the end walls 7 only about half-way to the lower edges 11 of the side walls.

Secured to the lower edge 12 of the back wall 8 is a forwardly declining bottom wall 13, having a lower and forward edge 14 which is approximately on a level with the lower edges 11 of the end walls 7 and is spaced rearwardly from the forward edges 15, 15 of the end walls 7 at a relatively short distance. Secured to and extending upwardly from the bottom wall 13 at its forward edge 14 is a relatively narrow feed retaining plate or board 16, whose elevated and forward edge 17 is preferably disposed slightly forward of the forward edges 15, 15 of the end walls 7, as shown in Figures 2 and 3.

Extending between the end walls 7, 7 and secured to their upper edges 9, 9 is a narrow top wall 18, whose forward edge 19 is preferably flush with the forward edges 15, 15 of the end walls 7, 7 and whose rear edge 20 is relatively greatly spaced from the rear edges 10, 10 of the end walls 7, 7.

Secured to the under side of the top wall 18 by means of nails 21 or the like, are parallel spaced vertical partition walls 22 which are also spaced from the end walls 7, 7. The lower end portions of the partition walls 22 are beveled, as indicated at 23 and 24 so as to conformably engage the top of the feed retaining plate 16 and an adjacent part of the top of the bottom wall 13, to which these beveled portions may be secured in suitable manner. The partition walls 22 have forward edges 25 which are preferably aligned with the forward edges 15, 15 of the end walls 7, 7, as shown in Figures 1 and 3.

Located behind the partition walls 22 and the rear edge 20 of the top wall 18 and slidably engaged therewith, is the feed regulating board or plate 26. The feed regulating plate 26 is arranged perpendicular to the lower edges 11, 11 of the end walls 7, 7, is somewhat shorter than the end walls 7, 7, and is held slidably in place by vertical cleats 27, 27 secured as indicated at 28, 28 to the inner sides of the end walls 7, 7, and engaging the rearward side of the regulating plate 26. The regulating plate 26 has a lower edge 26' which is normally spaced above the bottom wall 13, and the cleats 27 are spaced at a greater distance above the bottom wall 13.

The end walls 7, 7 are provided with holes near their upper ends, which are aligned with the ends of the regulating plate 26, and through which nails 29, 29 or pins are removably engaged with vertically spaced holes 30 provided in the end edges of the regulating plate 26. This arrangement provides for releasably securing the regulating plate 26 with its lower edge 26' spaced at different heights above the bottom wall 13 for regulating flow of feed down along the bottom wall 13, from the space therebehind, in accordance with feeding rate requirements.

The feed (not shown) to be dispensed is placed in the feeder in the space between the back wall 8 and the regulating plate 26 and falls gravitationally upon the declining bottom wall 13, along which the feed can slide to the retaining plate 16 at locations between adjacent partition walls 22 and between the end walls 7, 7 and partition walls 22 adjacent thereto, at a rate depending upon the vertical adjustment of the regulating plate 26.

While the above described feeding device is preferably made of wood in readily obtainable board sizes, for the sake of convenience and economy, the device can also be made of any other suitable materials, such as metals.

The device can also be made in any wanted sizes and with any desired number of partition walls 22, at desired spacings from each other to provide feeding stalls therebetween for different sizes and types of animals to be fed, even though the device is herein referred to as being especially devised for weaning pigs.

What is claimed is:

1. In an animal feeder, a pair of end walls, a vertical back wall extending between and secured to said end walls, a bottom plate extending between and secured to said end walls, said bottom wall declining forwardly from said back wall and having a lower end, a top wall spaced above said bottom wall and extending between and secured to said end walls, said top wall having a rear edge spaced forwardly from said back wall, vertical cleats secured to said end walls, said cleats having vertical forward edges spaced rearwardly from said rear edge of the top wall, a vertical feed regulating plate slidably engaged between the rear edge of the top wall and said forward edges of the cleats, said regulating plate having a lower edge and end edges slidably engaged with said end walls, and mounting means acting between an end wall and an end edge of the regulating plate and positioning said regulating plate with its lower edge over and spaced above said bottom wall.

2. In an animal feeder, a pair of end walls, a vertical back wall extending between and secured to said end walls, a bottom plate extending between and secured to said end walls, said bottom wall declining forwardly from said back wall and having a lower end, a top wall spaced above said bottom wall and extending between and secured to said end walls, said top wall having a rear edge spaced forwardly from said back wall, vertical cleats secured to said end walls, said cleats having vertical forward edges spaced rearwardly from said rear edge of the top wall, a vertical feed regulating plate slidably engaged between the rear edge of the top wall and said forward edges of the cleats, said regulating plate having a lower edge and end edges slidably engaged with said end walls, and mounting means acting between an end wall and an end edge of the regulating plate and positioning said regulating plate with its lower edge over and spaced above said bottom wall, said mounting means comprising vertically spaced sockets in said end edge of the regulating plate, and removable pins traversing said end wall and engaged in selected ones of the sockets.

3. In an animal feeder, a pair of end walls, a vertical back wall extending between and secured to said end walls, a bottom plate extending between and secured to said end walls, said bottom wall declining forwardly from said back wall and having a lower end, a top wall spaced above said bottom wall and extending between and secured to said end walls, said top wall having a rear edge spaced forwardly from said back wall, vertical cleats secured to said end walls, said cleats having vertical forward edges spaced rearwardly from said rear edge of the top wall, a vertical feed regulating plate slidably engaged between the rear edge of the top wall and said forward edges of the cleats, said regulating plate having a lower edge and end edges slidably engaged with said end walls, and mounting means acting between an end wall and an end edge of the regulating plate and positioning said regulating plate with its lower edge over and spaced above said bottom wall, and spaced partitions secured to and depending from said top wall forwardly of said regulating plate, said partition having rear edges with which said regulating plate is slidably engaged below said top wall.

References Cited in the file of this patent

UNITED STATES PATENTS

| | | |
|---|---|---|
| 878,086 | Pearson | Feb. 4, 1908 |
| 985,047 | McGinnis | Feb. 21, 1911 |
| 1,137,460 | Carlson | Apr. 27, 1915 |
| 1,221,355 | Moe | Apr. 3, 1917 |
| 1,227,892 | Darby | May 29, 1917 |
| 1,498,697 | Scholle | June 24, 1924 |
| 1,750,580 | Ebel | Mar. 11, 1930 |